United States Patent
Nishio et al.

(10) Patent No.: US 7,167,505 B2
(45) Date of Patent: Jan. 23, 2007

(54) RADIO RECEIVING APPARATUS AND RADIO RECEIVING METHOD

(75) Inventors: Akihiko Nishio, Yokosuka (JP); Katsuhiko Hiramatsu, Yokosuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 816 days.

(21) Appl. No.: 10/332,144

(22) PCT Filed: May 21, 2002

(86) PCT No.: PCT/JP02/04902

§ 371 (c)(1), (2), (4) Date: Jan. 6, 2003

(87) PCT Pub. No.: WO02/098011

PCT Pub. Date: Dec. 5, 2002

(65) Prior Publication Data

US 2003/0108091 A1 Jun. 12, 2003

(30) Foreign Application Priority Data

May 25, 2001 (JP) .............................. 2001-156625

(51) Int. Cl.
*H03D 1/04* (2006.01)
*H04B 1/00* (2006.01)
(52) U.S. Cl. ...................... 375/147; 375/150; 375/346
(58) Field of Classification Search ........ 375/346–349, 375/316, 147, 148, 150
See application file for complete search history.

(56) References Cited

U.S. PATENT DOCUMENTS 5,490,165 A * 2/1996 Blakeney et al. ........... 370/335

(Continued)

FOREIGN PATENT DOCUMENTS

DE 19826036 12/1999

(Continued)

OTHER PUBLICATIONS

International Search Report dated Jul. 23, 2002.

(Continued)

*Primary Examiner*—Chieh M. Fan
*Assistant Examiner*—Jason M. Perilla
(74) *Attorney, Agent, or Firm*—Stevens, Davis, Miller & Mosher, LLP (57) ABSTRACT

In maximum delay time setting section 106, a delay time width W' used for cancelling the interference is set using the delay profile. In the present embodiment, delay spread is calculated and a delay wave included in the delay spread is set as W'. First, the delay spread is calculated in delay spread calculating section 1061 of maximum delay time setting section 106. That is to say, the standard deviation of the delay profile is calculated. The calculated delay spread is outputted to maximum delay time determining section 1062. The maximum delay time (window width) W' is determined in maximum delay time determining section 1062 based on the delay spread. Therefore, the delay wave included in the maximum delay time which is determined by such a way is set to be an object of interference cancellation in joint detection. Thus, besides interference cancellation performance, optimization of calculation scale can be planned without losing performance of RAKE combining.

5 Claims, 5 Drawing Sheets

U.S. PATENT DOCUMENTS

| | | | |
|---|---|---|---|
| 6,034,986 A * | 3/2000 | Yellin | 375/148 |
| 6,044,104 A * | 3/2000 | Watanabe | 375/142 |
| 6,373,882 B1 * | 4/2002 | Atarius et al. | 375/148 |
| 6,408,039 B1 * | 6/2002 | Ito | 375/347 |
| 6,795,509 B1 * | 9/2004 | Yamamoto et al. | 375/267 |
| 7,079,569 B1 * | 7/2006 | Hayata | 375/147 |
| 2001/0014116 A1 * | 8/2001 | Saito et al. | 375/148 |
| 2001/0019578 A1 * | 9/2001 | Arima | 375/150 |
| 2002/0064208 A1 * | 5/2002 | Saito | 375/136 |

FOREIGN PATENT DOCUMENTS

| | | |
|---|---|---|
| JP | 2000 261412 | 9/2000 |
| JP | 2002 111542 | 4/2002 |
| JP | 2002 111546 | 4/2002 |
| WO | 9901946 | 1/1999 |

OTHER PUBLICATIONS

Karimi, H. R., "Efficient Multi-Rate Multi-User Detection for the Asynchronous WCDMA Uplink", Bell Labs, IEEE, VTC '99, pp. 593-597, 1999.

Supplementary European Search Report dated Jun. 5, 2003.

J. Nam, et al., "Combined Beamformer-Rake Receiver and Decorrelating Detector for Asynchronous CDMA Systems", Vehicular Technology Conference, IEEE, May 1999, pp. 2230-2234, XP010342299.

* cited by examiner

FROM DELAY PROFILE
GENERATING SECTION 105

RADIO RECEIVING APPARATUS AND RADIO RECEIVING METHOD

TECHNICAL FIELD

The present invention relates to a radio receiving apparatus and radio receiving method employed in a digital radio communication system.

BACKGROUND ART

In digital radio communication system, CDMA (Code Division Multiple Access) as a multiple access method takes benefits of the orthogonality between spreading codes, resulting in no interference due to cross correlation between spreading codes, thus, a plurality of spreading codes can be multiplexed and transmitted.

However, because there is a multipath in real propagation environments, the orthogonality between spreading codes is no longer hold and an interference is generated when multiplexing (code multiplexing) and transmitting a plurality of spreading codes. In CDMA, RAKE combining is employed and effective advantages were shown when using RAKE combining in which a plurality of paths are combined in multipath propagation environments encountered a large interference deterioration.

Several methods to cancel multipath interference have been proposed. As one of those methods, the method of Karimi ("EFFICIENT MULTI-RATE MULTI-USER DETECTION FOR THE ASYNCHRONOUS WCDMA UPLINK", H. R. Karimi, VTC'99, pp. 593–597: Joint Detection: JD). Such a joint detection method will be explained using FIG. 1.

Figure 1:
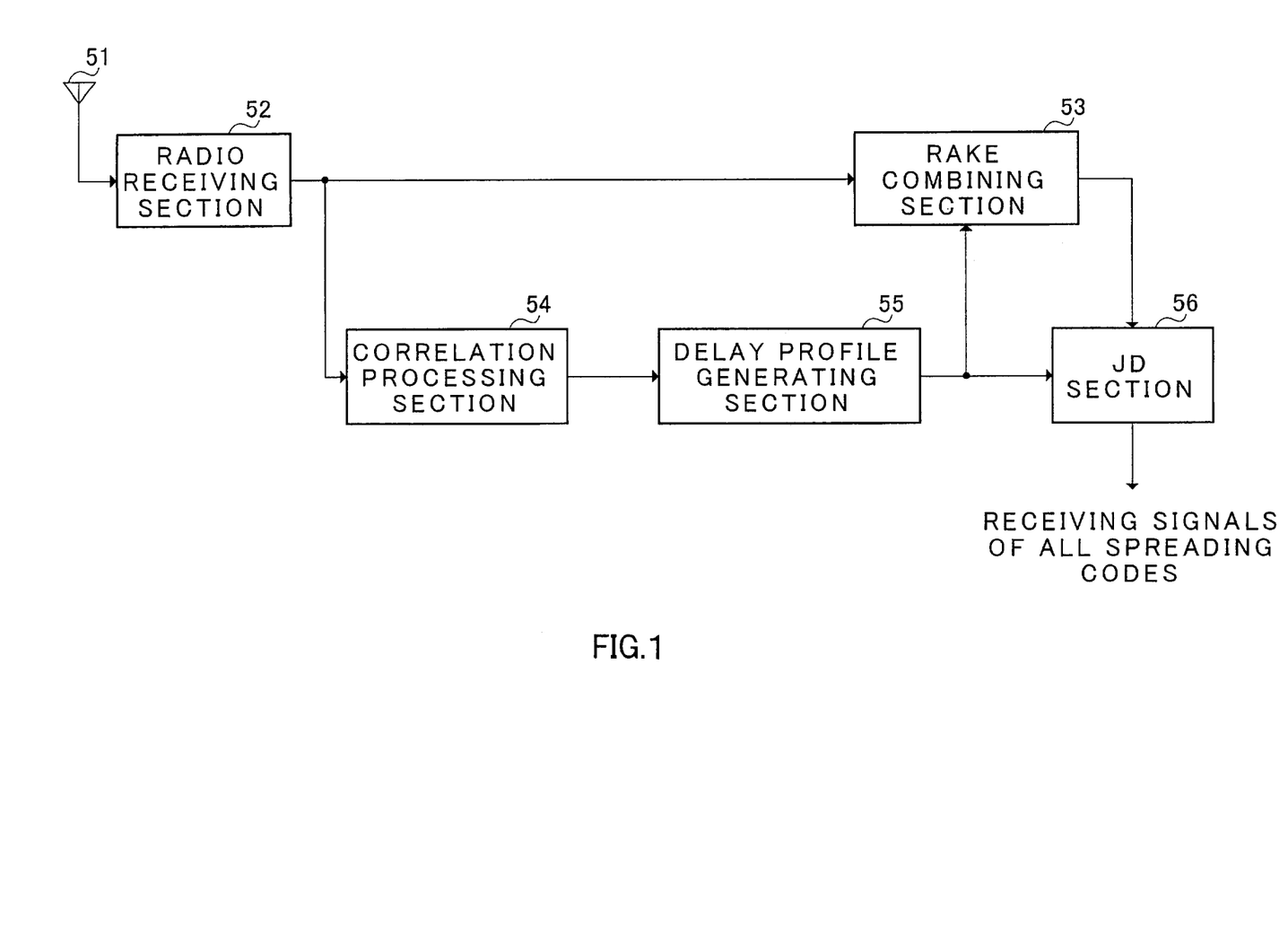
FIG. 1 is a block diagram showing a configuration of a conventional radio receiving apparatus.

A radio signal is received in radio receiving section 52 via antenna 51. In radio receiving section 52, predetermined radio reception processing (such as, down conversion, A/D conversion, etc.) are performed on the received signal, and the signal being subjected to radio reception processing is outputted to RAKE combining section 53 and correlation processing section 54.

In correlation processing section 54, a correlation processing between a known signal (midamble) and the signal being subjected to radio reception processing is carried out. The signal after correlation processing (correlation result) is outputted to delay profile generating section 55. A delay profile is generated in delay profile generating section 55 based on the correlation result. This delay profile is outputted to RAKE combining section 53.

In RAKE combining section 53, RAKE combining is carried out based on the delay profile, and the result of RAKE combining is outputted to JD section 56. Joint detection processing is performed on the signal being subjected to RAKE combining in JD section 56 in accordance with maximum delay time. Receiving signals of all codes are outputted after the joint detection processing.

In such a joint detection processing, a matrix A is generated by calculating the convolution between the delay profile and spreading codes, then, the cross correlation $A^H A$ of the matrix A is calculated, finally, from the expression ($A^H A$ x=b), in which the cross correlation $A^H A$ is multiplied by the transmission symbol x and b is obtained after RAKE combining multiplication result, the interference caused due to cross correlation between spreading codes is cancelled and keeping only transmission symbol x given in the above expression, then the receiving signals of all codes are outputted.

The amount of calculations to generate the matrix A in the joint detection processing is given by (NQ+W−1)×(KN) assuming that N is the number of transmission symbols, Q is the spreading sequence, W is the delay time window (expressed in CDMA chip time unit), and K is the number of the transmitting multicode. Moreover, the amount of calculating the cross correlation $A^H A$ becomes KN×KN which is extremely large amount. In this case, the influence of the delay time window W is extremely large.

In conventional radio reception method, the delay time window W is set to include the delay signal of maximum delay time. In other words, as can be explained using FIG. 4, the delay time window W is set to include all the 3 paths in which $|\alpha_2|^2$ which has the greatest delay time is included. Such a window is similar to the window used in RAKE combining.

On the other hand, the advantages of using RAKE combining are difficult to be achieved if the window width W of both RAKE combining and joint detection is simply set to small value so that only one of the multipath may be included, in order to decrease the amount of calculation.

DISCLOSURE OF INVENTION

It is an object of the present invention to provide radio receiving apparatus and radio receiving method which are able not only to prevent deterioration of the RAKE combining performance, but also able to optimize the performance of interference cancellation and the calculation scale.

The inventors reach the present invention by focusing their attention on the existence of a plurality of delay waves that have small delay from the precedence signal and the existence of few delay waves which are largely separated from the precedence signal in radio communication under multipath environment, and reducing the calculation amount by cancelling peripheral multipath interferences of the precedence wave so that a sufficient performance is obtained.

In other words, such an object can be achieved by setting a delay time, which is shorter than the delay time used in RAKE combining, in a delay profile generated based on the known signal included in the receiving signal, within the range of this delay time, interference cancellation processing is performed on the signal after being RAKE combined so that the receiving signals of all codes are outputted, and carrying out a sufficient cancellation of the interference caused due to cross correlation between spreading codes while keeping the RAKE combining performance and reducing the operation scale of interference cancellation and amount of calculation.

BEST MODE FOR CARRYING OUT THE INVENTION

Hereafter, embodiments of the present invention will be specifically described with reference to the accompanying drawings.

(Embodiment 1)

In the present embodiment, maximum delay time setting using delay spread of receiving signal together with the case when obtaining receiving signal after performing interference cancellation using such a maximum delay time will be explained.

Figure 2:
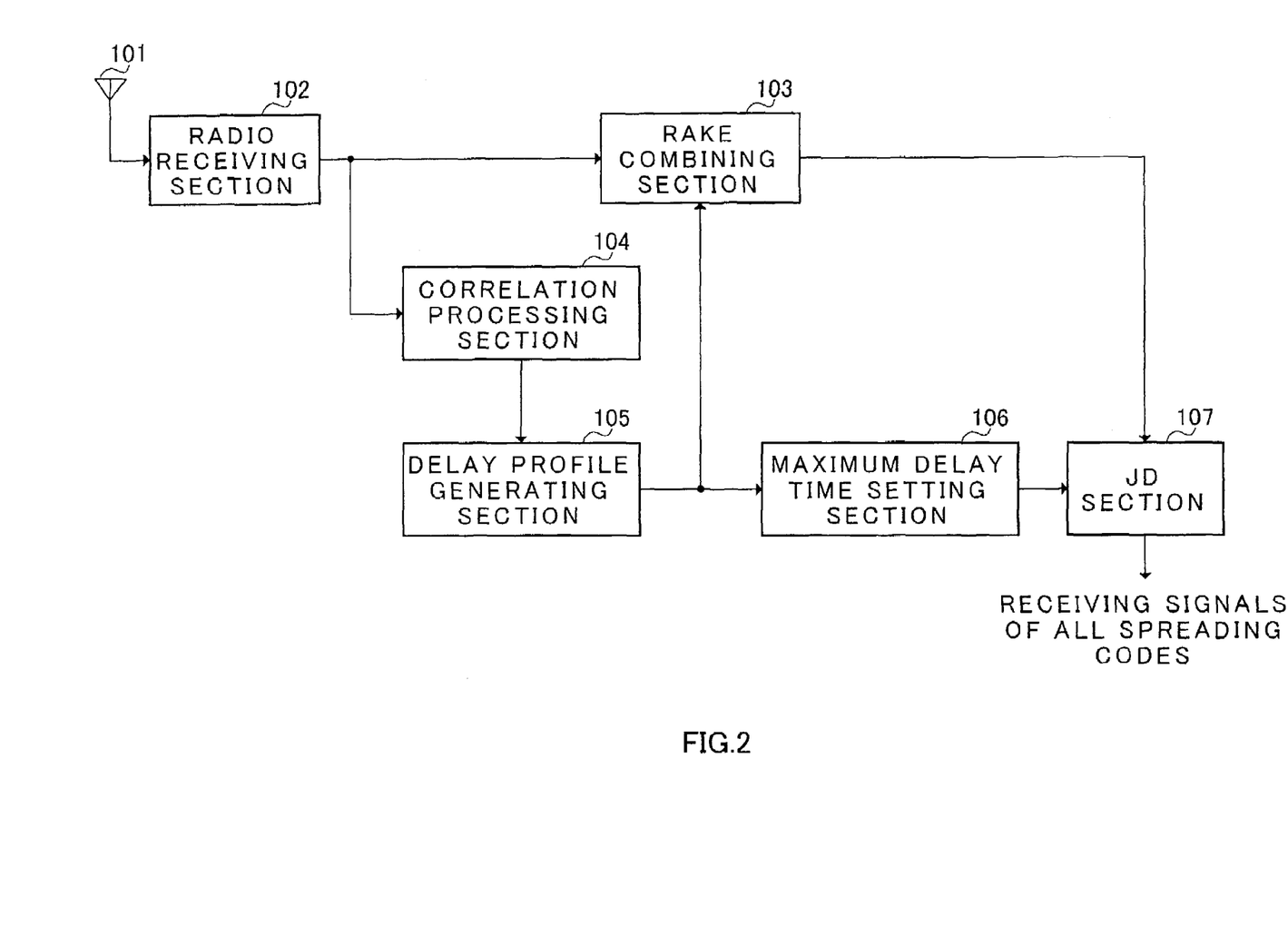
FIG. 2 is a block diagram showing a configuration of a radio receiving apparatus according to Embodiment 1 of the present invention.
Figure 3:
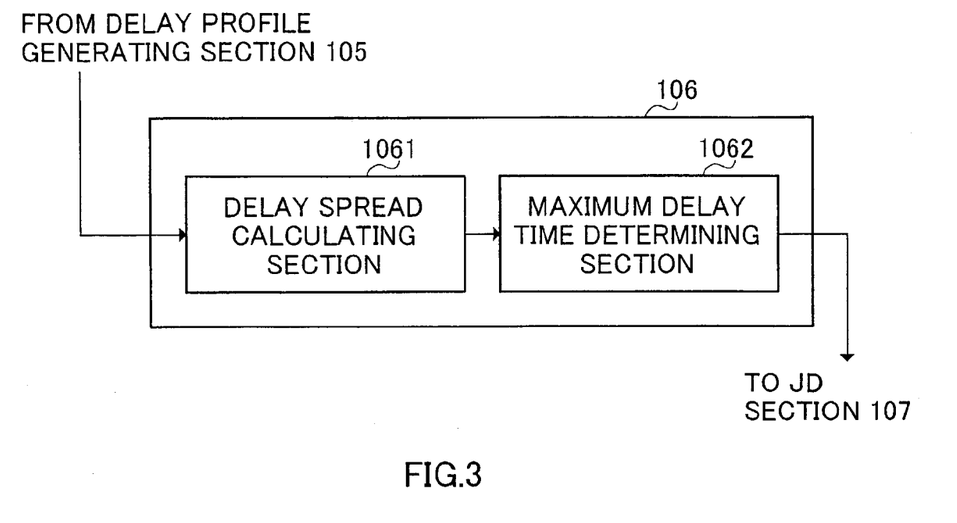
FIG. 3 is a block diagram showing a configuration of a maximum delay time setting section included in radio receiving apparatus according to Embodiment 1 of the present invention.

FIG. 2 is a block diagram showing a configuration of a radio receiving apparatus according to Embodiment 1 of the present invention, and FIG. 3 is a block diagram showing a configuration of a maximum delay time setting section included in radio receiving apparatus according to Embodiment 1 of the present invention.

A radio signal is received in radio receiving section 102 via antenna 101. In radio receiving section 102, predetermined radio reception processing (such as, down conversion, A/D conversion, etc.) are performed on the received signal, and the signal being subjected to radio reception processing is outputted to RAKE combining section 103 and correlation processing section 104.

In correlation processing section 104, a correlation processing between a known signal (midamble) and the signal being subjected to radio reception processing is carried out. The signal after correlation processing (correlation result) is outputted to delay profile generating section 105. A delay profile is generated in delay profile generating section 105 based on the correlation result. This delay profile is outputted to RAKE combining section 103 and maximum delay time setting section 106.

Based on the delay profile, the range of a delay wave used for cancelling the interference is determined and the maximum delay time is set in maximum delay time setting section 106. This maximum delay time is outputted to JD section 107.

Maximum delay time setting section 106, as shown in FIG. 3, comprises delay spread calculating section 1061 to obtain delay spread from the delay profile and maximum delay time determining section 1062 to determine the maximum delay time from the delay spread.

In RAKE combining section 103, RAKE combining is carried out based on the delay profile, and the RAKE combining result is outputted to JD section 107. According to the maximum delay time, joint detection processing is performed on the signal being subjected to RAKE combining in JD section 107. Receiving signals of all codes are outputted after this joint detection processing.

Operation of the radio receiving apparatus comprising the aforementioned configuration will be explained below.

A radio signal of a system in which interference cancellation is carried out by joint detection is composed of a known signal (midamble) used for estimating the delay profile and data signal.

Figure 4:
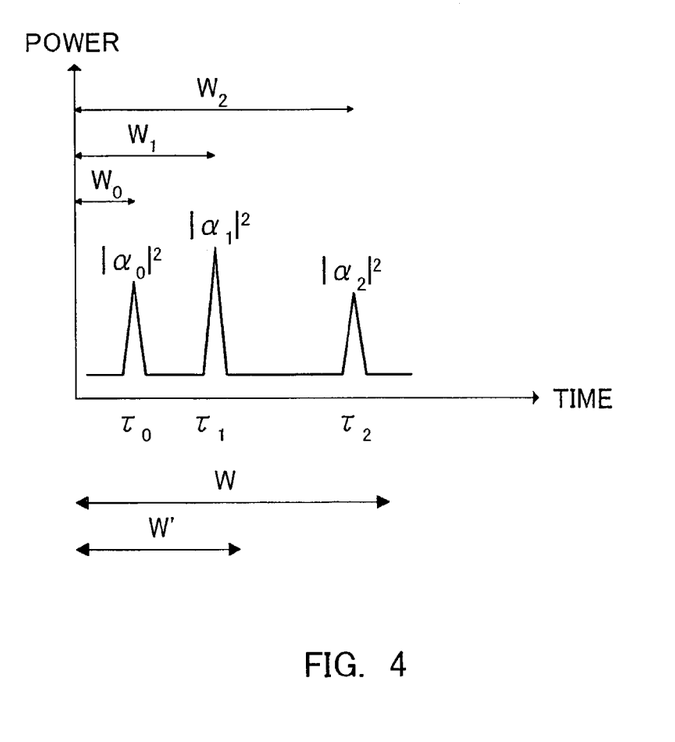
FIG. 4 is an illustration graph to explain maximum delay time.

As thus described above, after the radio signal which composed of midamble and data was converted into a baseband signal, it is subjected to correlation processing in correlation processing section 104. In this correlation processing, the correlation between the midamble and the received signal is carried out. The result of the correlation processing is outputted to delay profile generating section 105, and as shown in FIG. 4, the delay profile is generated.

The delay profile is expressed by the time $\tau_k$ of the channel estimation value of the power of $\alpha_k$ which is given by $|\alpha_k|^2$. In addition, FIG. 4 shows the case of 3 paths. That is to say, in the delay profile shown in FIG. 4, the path of time $\tau_0$ is shown by the channel estimation value of the power of $\alpha_0$ which is given by $|\alpha_0|^2$, the path of time $\tau_1$ is shown by the channel estimation value of the power of $\alpha_1$ which is given by $|\alpha_1|^2$, and the path of the time $\tau_2$ is shown by the channel estimation value of the power of $\alpha_2$ which is given by $|\alpha_2|^2$. Moreover, the value W in FIG. 4 shows the window width including the delay wave of which the delay time serves as the maximum, and which is used as window width in RAKE combining.

In RAKE combining section 103, a despreading processing is performed on the signal after being subjected to radio reception processing using the same spreading code as the spreading code used by the transmission side apparatus, and the signal after such despreading processing (despreading signal) and the delay profile are employed to carry out RAKE combining. This RAKE combining is carried out when all multi-paths are included in the time period (window width) W. The result obtained by the RAKE combining is the receiving signal when the cross correlation between spreading codes is not cancelled. Here, the result of the RAKE combining is shown by the vector b.

In maximum delay time setting section 106, a delay time width W' used for cancelling the interference is set using the delay profile. In the present embodiment, the delay spread is calculated and the delay time window of delay wave included in the delay spread is set as W'.

First, the delay spread is calculated in delay spread calculating section 1061 of maximum delay time setting section 106. That is to say, the standard deviation of the delay profile is calculated. The calculated delay spread is outputted to maximum delay time determining section 1062. The maximum delay time (window width) W' is determined in maximum delay time determining section 1062 based on the delay spread.

Thus, since the maximum delay time is set according to the delay spread, it is possible to set the maximum delay time that includes the delay waves which cause interference and are to be cancelled by JD., hence, it becomes possible to reduce the performance degradation by making the window width narrower than that of RAKE combining.

Therefore, The delay waves within the maximum delay time set as described above are included in interference cancellation in JD. Here, window width is the maximum delay time W' which includes the paths of delay time $\tau_0$ and $\tau_1$.

Figure 5:
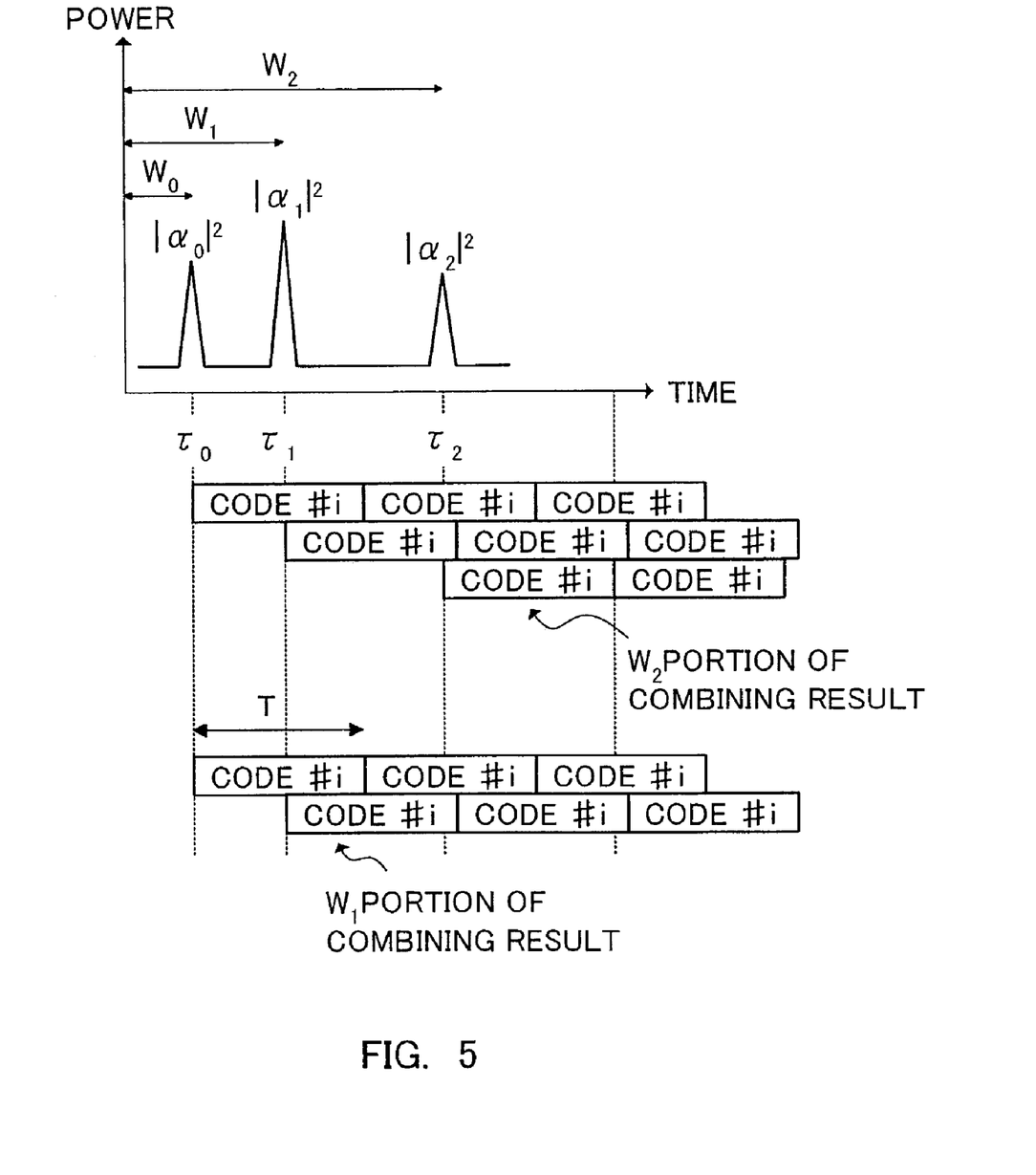
FIG. 5 is an illustration graph to explain the setting of maximum delay time.

The convolution between the delay profile and spreading codes is calculated in JD section 107 so as to generate the matrix A. Assuming that the number of transmission symbols is N, spreading sequence is Q, maximum delay time (window width) is W', and the number of transmission multicode is K, then, the amount of calculating the matrix A is given by (NQ+W'−1)×(KN). Therefore, by narrowing the window width from W to W' comparing to the conventional one, the amount of calculation becomes less than that in conventional one. That is to say, conventionally, since the window width of JD is the domain that includes all paths, $W_2$ portion (window width that includes delay waves $\tau_0$, $\tau_1$, and $\tau_2$) is required to perform the calculation, as shown in FIG. 5, on the other hand, according to the present embodiment, since the window width of JD is $W_1$ (window width that includes delay waves $\tau_0$ and $\tau_1$), only $W_1$ portion is reserved for calculation.

Subsequently, the matrix $A^H A$ of the correlation matrix A is calculated in JD section 107. The calculation amount of the correlation $A^H A$ becomes (KN)×(KN). After that, by solving the formula $A^H A x=b$ for the transmitting symbol x, i.e., by carrying out the multiplication of the inverse $[A^H A]^{-1}$ of the matrix $A^H A$ by the RAKE combining result b, it is possible to demodulate a plurality of signals of which the cross correlation of the spreading code is cancelled in the path (path of delay time $\tau_0$ and $\tau_1$) included in window width W'. Thus, the receiving signals of all codes can be obtained.

The operation which explains precisely the effect of the radio receiving apparatus according to Embodiment 1 of the present invention will be given below.

Figure 6:
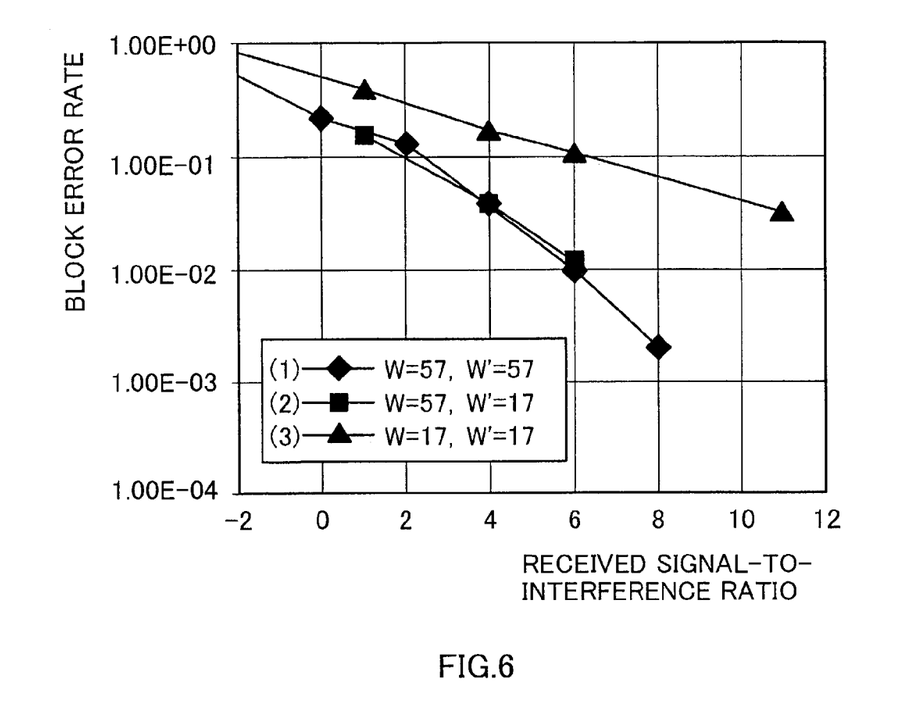
FIG. 6 is a graph showing the results of a radio receiving apparatus according to Embodiment 1 of the present invention.

FIG. 6 is a graph to explain the effect of a radio receiving apparatus according to Embodiment 1 of the present invention. In FIG. 6, the mark ◆ (1) shows the case where both window width W used for RAKE combining and window width W' used for JD is 57, the mark ■ (2) shows the case (present embodiment) where window width W used for RAKE combining is 57 while window width W' used for RAKE combining is 17, and the mark ▲ (3) shows the case where both window width W used for RAKE combining and window width W' used for JD is 17.

In case (1), because window width is wide, the best performance can be obtained, but the calculation scale becomes large as the window width of JD is wide. In case (2), since the window width of both RAKE combining and JD is independently optimized, the same RAKE combining performance as that of case (1) can be kept. In this case, since the window width of JD is narrow, the calculation scale becomes small. In case (3), aiming at decreasing the calculation scale, the window width of both RAKE combining and JD are made narrow, thus, sufficient performance (RAKE combining gain) cannot be obtained.

Moreover, relating to the amount of calculation, the calculation amount of 5 slots in case (1) becomes 100%, whereas the calculation amount of 3 slots in case (1) becomes 60%. Therefore, In a condition to realize the RAKE combining performance similar to case (1), window width of both RAKE combining and JD was independently optimized for each in case (2), and the calculation amount of 5 slots becomes 46% while calculation amount of 3 slots becomes 27%, hence, calculation amount is considerably reduced.

According to the present embodiment, it is possible to consider all of the multi-paths when using all delay time window width W in RAKE combining, and thus it is possible to increase the signal-to-noise ratio (S/N).

In addition, it is also possible to reduce the calculation amount of interference cancellation (JD) since the range (JD window width) required for cancelling the interferences is set to W' which is smaller than W.

That is to say, according to the present embodiment, a maximum performance can be obtained since all of the multi-paths are used in RAKE combining, and it is not only possible to carry out a sufficient cancellation of the interference caused due to cross correlations between spreading codes but it is also possible to reduce the calculation amount of JD while keeping the performance of RAKE combining because the window width is optimally set based on the delay spread.

(Embodiment 2)

In the present embodiment, a maximum delay time is set by carrying out threshold value decision on the correlation value resulted from calculating the convolution of the delay profile of spreading codes, and the case when outputting receiving signal after performing interference cancellation using such a maximum delay time will be explained.

Figure 7:
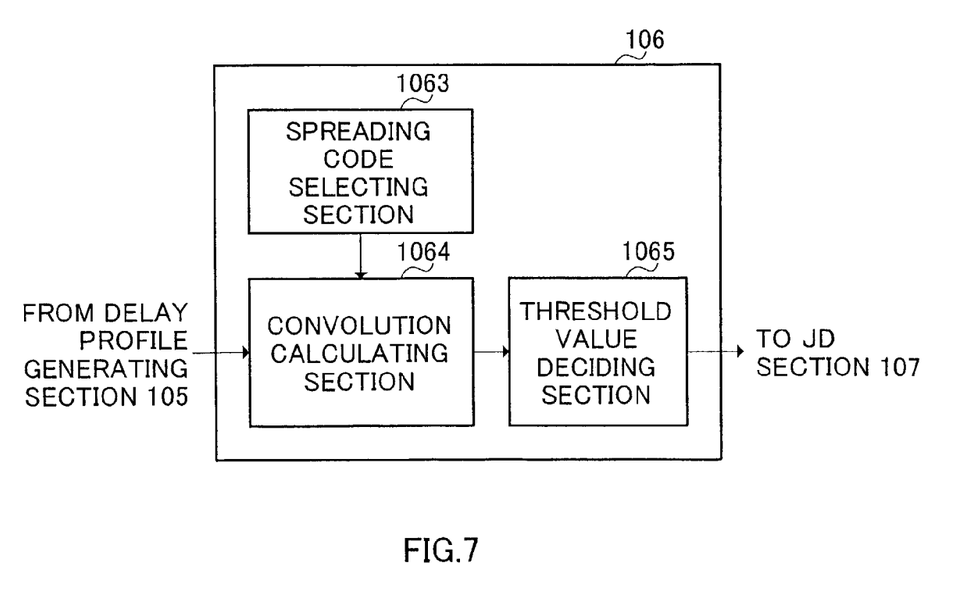
FIG. 7 is a block diagram showing a configuration of a maximum delay time setting section included in radio receiving apparatus according to Embodiment 2 of the present invention.

FIG. 7 is a block diagram showing a configuration of maximum delay time setting section included in radio receiving apparatus according to Embodiment 2 of the present invention.

In FIG. 7, maximum delay time setting section 106 comprises spreading code selecting section 1063 to select a set of spreading codes to be convoluted with delay profile, convolution calculating section 1064 to calculate cross correlation from the result of convolution calculation between the selected spreading codes and the delay profile, and threshold value deciding section 1065 to carry out threshold value decision as compared to cross correlation value resulted from convolution operation.

The operation of radio receiving apparatus comprising the aforementioned configuration will be explained below.

Operation of the receiving radio signal and generating delay profile is similar to that of Embodiment 1, and hence explanation thereof is omitted.

In RAKE combining section 103, despreading processing is performed on the signal after being subjected to radio reception processing using the same spreading code as the spreading code used by transmission side apparatus, both signal after such despreading processing (despreading signal) and delay profile are employed to carry out RAKE combining. This RAKE combining is carried out using all multi-paths which are included in the time period (window width) W. The result obtained by RAKE combining is the receiving signal when cross correlation between spreading codes is not cancelled. Here, the result of RAKE combining is shown by the vector b.

In maximum delay time setting section 106, a delay time width W' used for cancelling the interference is set using delay profile. In the present embodiment, a threshold value decision as compared to correlation value result from convolution operation of spreading codes and delay profile is carried out, in other words, maximum delay time W' is set by carrying out threshold value decision as compared to cross correlation of spreading codes optionally chosen.

First, in spreading code selecting section 1063, the set of spreading codes to be used in convolution operation is selected, and this set of spreading codes is outputted to convolution calculating section 1064. Each of spreading codes and delay profile are subjected to convolution operation in convolution calculating section 1064. Then, correlation is calculated from the results each spreading code and delay profile are convolution-operated. This correlation result is equivalent to cross correlation between spreading codes when there is a delay wave. Several window widths $W_k$ can be manipulated relating to cross correlation value.

Convolution calculating section 1064 outputs the obtained cross correlation value to threshold value deciding section 1065. In threshold value deciding section 1065, cross correlation values of several window width P ($W_k$) are compared to a previously set threshold value $P_{th}$. In addition, W' which becomes smaller than this threshold value $P_{th}$ is acquired.

For example, as shown in FIG. 4, when $W_0$ is the window width that the delay wave $\tau_0$ is included in, $W_1$ is the window width that the delay waves $\tau_0$ and $\tau_1$ are included in, and $W_2$ (=W) is the window width that the delay waves $\tau_0$, $\tau_1$, and $\tau_2$ are included in, a threshold value decision is performed on cross correlation value in threshold value deciding section 1065.

Particularly, in case when $$\{P(W)-P(W_0)\}/P(W)>P_{th}$$

and $$\{P(W)-P(W_1)\}/P(W)<P_{th},$$

and when the window width of the interference cancellation (JD) is $W_0$, the difference of a real interference amount P (W) and the interference amount P ($W_0$) when the window width is $W_0$ becomes large. Therefore, when the window width is $W_0$, the interference cancellation ability is expected to be small.

In addition, when the window width of the interference cancellation (JD) is W1, the difference of a real interference amount P (W) and the interference amount P ($W_1$) when the window width is $W_1$ becomes small. Therefore, when the window width is $W_1$, it is possible to decide that there is no difference of the ability of interference cancellation when it was carried out in window width W. However, in such a case, window width W' of the interference cancellation (JD) is set to $W_1$.

Accordingly, when the difference between real interference amount and interference amount of a temporarily set window width is smaller than a determined amount, due to setting the window width narrower than that in RAKE combining case performance deterioration shall be avoided because this temporarily set window width includes the effective delay time. In addition, the threshold value can be set appropriately to keep the performance deterioration in the range that does not affect the system by setting the window width smaller than that in the case of RAKE combining.

The delay waves within the window width set as described above are included in interference cancellation in JD. Here, window width is the maximum delay time W' which includes the paths of delay time $\tau_0$ and $\tau_1$.

The convolution between delay profile and spreading code is calculated in JD section 107 so as to generate the matrix A. Assuming that the number of transmission symbols is N, spreading sequence is Q, maximum delay time (window width) is W', and the number of transmission multicode is K, then, the amount of calculating the matrix A is given by (NQ+W'-1)×(KN). Therefore, by narrowing the conventional window width from W to W', the amount of calculation becomes less than that in conventional one.

Subsequently, the matrix $A^H A$ of the correlation matrix A is calculated in JD section 107. The calculation amount of the correlation operation $A^H A$ becomes (KN)×(KN). After that, by solving the expression $A^H A$ x=b for the transmitting symbol x, i.e., by carrying out the multiplication of the inverse $[A^H A]^{-1}$ of matrix $A^H A$ by RAKE combining result b, it is possible to demodulate a plurality of signals of which the cross correlations of spreading codes are cancelled in the path (path of delay time $\tau_0$ and $\tau_1$) included in window width W'. Thus, the receiving signals of all codes are obtained.

Furthermore, in the present embodiment, it is possible to show the same effect as that of Embodiment 1. That is, maximum performance can be drawn since all of the multi-paths are used in RAKE combining, and relating to JD, it is not only possible to carry out a sufficient cancellation of the interference due to cross correlations between spreading codes but it is also possible to reduce the calculation amount of JD while keeping the performance of RAKE combining because the window width is optimally set based on the delay spread.

The present invention is not limited to the aforementioned embodiments 1 and 2, and various changes can be made without varying from the scope of the invention. For example, in the aforementioned embodiments 1 and 2, although the case when the number of paths is 3 was explained, but the present invention can also be applied similarly when the number of paths is 2, 4 or more.

The radio receiving apparatus and radio receiving method of the present invention can be applied to digital radio communication system, particularly to radio base station apparatus of CDMA system.

In the radio receiving apparatus and radio receiving method of the present invention according to the aforementioned description the maximum performance can be drawn since all of the multi-paths are used in RAKE combining, and relating to JD, it is not only possible to carry out a sufficient cancellation of the interference due to cross correlations between spreading codes but it is also possible to reduce the calculation amount of JD while keeping the performance of RAKE combining because the window width is optimally set based on the delay spread.

The present application is based on the Japanese Patent Application No. 2001-156625 filed on May 25, 2001, entire content of which is expressly incorporated by reference herein.

INDUSTRIAL APPLICABILITY

The present invention relates to a radio receiving apparatus and radio receiving method employed in a digital radio communication system.

The invention claimed is:

1. A radio receiving apparatus comprising:
    a delay profile generating section that generates a delay profile using a known signal included in a receiving signal in which one or more user signals are code-multiplexed;
    a RAKE combining section that carries out RAKE combining using the receiving signal and the delay profile, within a range of a first delay time set in advance based on the delay profile;
    a maximum delay time setting section that sets a second delay time that is shorter than the first delay time; and
    an interference cancellation section that carries out interference cancellation processing on the receiving signal after said RAKE combining within a range of the second delay time and outputs receiving signals of all codes.

2. The radio receiving apparatus according to claim 1, wherein said maximum delay time setting section sets the second delay time based on a delay spread obtained from said delay profile.

3. A radio base station apparatus comprising a radio receiving apparatus, wherein said radio receiving apparatus comprises:
    a delay profile generating section that generates a delay profile using a known signal included in a receiving signal in which one or more user signals are code-multiplexed;

a RAKE combining section that carries out RAKE combining using the receiving signal and the delay profile, within a range of a first delay time based on said delay profile;

a maximum delay time setting section that sets a second delay time that is shorter than the first delay time; and an interference cancellation section that carries out interference cancellation processing on the receiving signal after said RAKE combining within a range of the second delay time and outputs receiving signals of all codes.

4. A radio receiving method comprising:

a delay profile generating step of generating a delay profile using a known signal included in a receiving signal in which one or more user signals are code-multiplexed;

a RAKE combining step of carrying out RAKE combining using the receiving signal and the delay profile, within the a range of a first delay time set in advance based on the delay profile;

a maximum delay time setting step of setting a second delay time that is shorter than the first delay time; and an interference cancellation step of carrying out interference cancellation processing on the receiving signal after said RAKE combining within a range of the second delay time and outputting receiving signals of all codes.

5. The radio receiving method according to claim 4, wherein said second delay time is determined by a delay spread obtained from said delay profile.

* * * * *